(12) United States Patent
Sun et al.

(10) Patent No.: US 11,460,604 B2
(45) Date of Patent: Oct. 4, 2022

(54) SYSTEMS AND METHODS FOR FORECASTING WELL INTERFERENCE

(71) Applicant: HALLIBURTON ENERGY SERVICES, INC., Houston, TX (US)

(72) Inventors: Jianlei Sun, Katy, TX (US); Jianfu Ma, Pearland, TX (US); Dwight David Fulton, Cypress, TX (US); Ajish Sreeni Radhakrishnan Potty, Missouri City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 570 days.

(21) Appl. No.: 16/516,020

(22) Filed: Jul. 18, 2019

(65) Prior Publication Data

US 2021/0018655 A1 Jan. 21, 2021

(51) Int. Cl.
*G01V 99/00* (2009.01)
*G06N 20/20* (2019.01)

(52) U.S. Cl.
CPC .......... *G01V 99/005* (2013.01); *G06N 20/20* (2019.01)

(58) Field of Classification Search
CPC .................. G01V 99/005; G06N 20/20
See application file for complete search history.

(56) References Cited

U.S. PATENT DOCUMENTS

| 8,438,120 | B2 | 5/2013 | Raaijmakers |
| 2014/0372346 | A1 | 12/2014 | Phillipps et al. |
| 2021/0010351 | A1* | 1/2021 | Sun .................. G06N 3/0454 |

FOREIGN PATENT DOCUMENTS

CA 2980009 A1 3/2019

OTHER PUBLICATIONS

Yang et al., On hyperparameter optimization of machine learning algorithms: Theory and practice, Jul. 25, 2020, Neurocomputing vol. 415, pp. 295-316 (Year: 2020).*
Wang et al., A XGBOOST Risk Model via Feature Selection and Bayesian Hyper-Parameter Optimization, Jan. 24, 2019, International Journal of Database Management Systems, arXiv:1901.08433, pp. 1-17 (Year: 2019).*
Maucec et al., Application of Automated Machine Learning for Multi-Variate Prediction of Well Production (ABSTRACT), Mar. 18, 2019, SPE Middle EAST Oil and Gas Show and Conference, SPE-195022-MS (Year: 2019).*

(Continued)

*Primary Examiner* — Mischita L Henson
(74) *Attorney, Agent, or Firm* — Novak Druce Carroll LLP

(57) ABSTRACT

Disclosed are systems and methods for obtaining input data comprising properties associated with at least one parent well and a child well associated with the at least one parent well, dividing the input data into a training data subset, a validation data subset, and a test data subset, selecting at least one machine learning model using the training data subset, the validation data subset, and the test data subset based on k-fold cross validation, tuning hyper parameters for each of the at least one machine learning model, and generating a learning output using the at least one machine learning model and the hyper parameters for each of the at least one machine learning model, the learning output indicating a test root-mean-square error (RMSE) and a training RMSE.

20 Claims, 9 Drawing Sheets

(56) References Cited

OTHER PUBLICATIONS

Lindsay, G. et al., "Production Performance of Infill Horizontal Wells vs. Pre-Existing Wells in the Major US Unconventional Basins", Society of Petroleum Engineers; SPE-189874-MS; 2018.
Torres, Mauricio et al., abstract of "Modeling Interwell Fracture Interference and Huff-N-Puff Pressure Containment in Eagle Ford Using EDFM", Society of Petroleum Engineers; SPE-195240-MS; 2019.
Pankaj, Piyush et al., "Application of Data Science and Machine Learning for Well Completion Optimization", Offshore Technology Conference; OTC-28632-MS; Apr. 30-May 3, 2018.
Agharzayeva, Zinyat, "Application of Machine Learning and Data Analytics Methods to Detect Interference Effects From Offset Wells", a Thesis submitted to Office of Graduate and Professional Studies of Texas A&M University; Aug. 2018.

* cited by examiner

| Case # | C1 Prod, MBOE | TVD, ft | Latitude | Longitude | Lateral Length, ft | Fluid Volume, MMgal | Proppant Mass, MMlb |
|---|---|---|---|---|---|---|---|
| 1 | 28.1 | 8780 | 33.0 | -103.8 | 4130 | 10.6 | 9.8 |
| 2 | 16.5 | 8730 | 33.0 | -103.8 | 4310 | 10.6 | 9.8 |
| 3 | 14.6 | 8920 | 33.0 | -103.8 | 4360 | 10.6 | 9.8 |
| 4 | 58.1 | 8720 | 33.0 | -103.8 | 3970 | 10.6 | 9.8 |
| 5 | 18.0 | 8800 | 33.0 | -103.8 | 4120 | 10.6 | 9.8 |

Table 1 – First five rows of the field dataset from Permian wells and fracture jobs.

| Case # | P1_distance, ft | P1_time, days | P1_prod, MBOE | P2_distance, ft | P2_time, days | P2_prod, MBOE |
|---|---|---|---|---|---|---|
| 1 | 1330 | 240 | 63.1 | 1210 | 60 | 13.9 |
| 2 | 1000 | 150 | 19.0 | 1580 | 120 | 60.4 |
| 3 | 1160 | 780 | 68.7 | 1800 | 60 | 6.8 |
| 4 | 1300 | 330 | 110.9 | 1210 | 90 | 35.6 |
| 5 | 3420 | 300 | 33.99 | 2830 | 30 | 0.87 |

Table 2 – First five rows of the field dataset from Permian wells and fracture jobs.

FIG. 5

SYSTEMS AND METHODS FOR FORECASTING WELL INTERFERENCE

TECHNICAL FIELD

The present technology pertains to forecasting well interference and more specifically to predicting infill or child well production efficiently.

BACKGROUND

Hydraulic fracturing treatments may induce complex network geometries, which make evaluating well productivity challenging using physics-based modeling approaches. With decreased perforation cluster spacing along a wellbore and increased treatment size, well production forecasting has become uncertain as a result of possible interrelated effects of well interference and near-wellbore fracture competition. Conventional approaches do not address variations that may be encountered such as measurement errors or data variation commonly observed in field production data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 5 is a diagram of tables of data used by the well interference system, in accordance with some examples;

DETAILED DESCRIPTION

Figure 1:
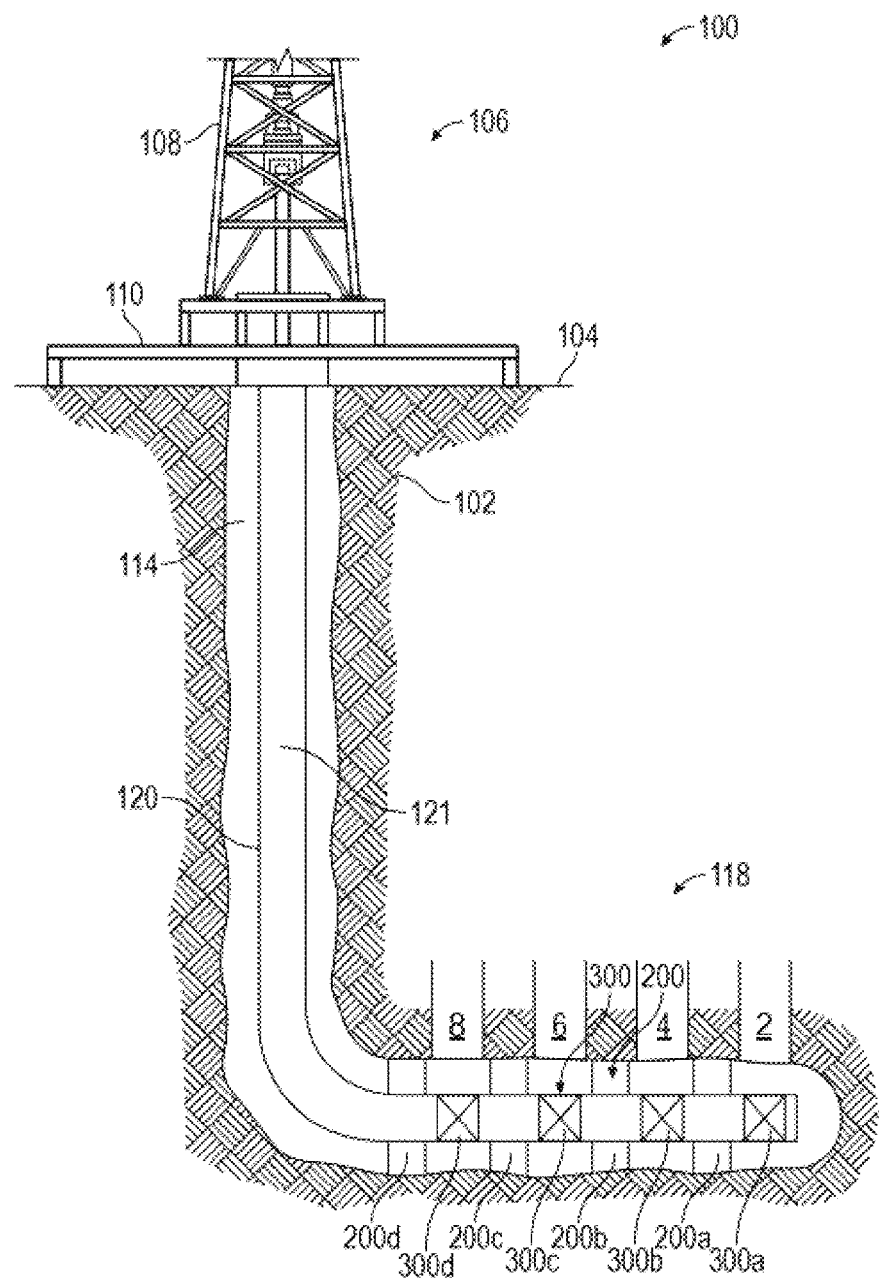
FIG. 1 is a schematic diagram of a wellbore operating environment that may include a well interference system, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below, will be readily apparent to those skilled in the art with the aid of this disclosure upon reading the following detailed description, and by referring to the accompanying drawings.

Disclosed herein are systems, methods, and computer-readable storage media for forecasting well interference and predicting infill or child well production efficiently. A well interference system may obtain input data associated with one or more wells such as one or more fully-bounded or half-bounded child wells and associated parent wells. The well interference system may determine one or more machine learning models that best show well interference effects between the child well and the associated parent wells and use the one or more machine learning models to address well completion and/or reservoir related features. The well interference system can be used to provide feedback and forecasting for the child well and the one or more parent wells in real-time or near real-time.

The well interference system may utilize input data and parameters related to completion design and well interference including raw data collection, data processing and transformation, machine learning model development, hyper parameter tuning and model ensemblement, and model validation and evaluation. The trained and developed machine learning model can be used to predict infill or child well production efficiently and be used for real-time applications.

According to at least one aspect, an example method for forecasting well interference is provided. The method can include obtaining, by at least one processor, input data comprising properties associated with at least one parent well and a child well associated with the at least one parent well, dividing, by the at least one processor, the input data into a training data subset, a validation data subset, and a test data subset, selecting, by the at least one processor, at least one machine learning model using the training data subset, the validation data subset, and the test data subset based on k-fold cross validation, tuning, by the at least one processor, hyper parameters for each of the at least one machine learning model, and generating, by the at least one processor, a learning output using the at least one machine learning model and the hyper parameters for each of the at least one machine learning model, the learning output indicating a test root-mean-square error (RMSE) and a training RMSE.

According to at least one aspect, an example system for forecasting well interference is provided. The system can include at least one processor coupled with at least one computer-readable storage medium having stored therein instructions which, when executed by the at least one processor, causes the system to obtain input data comprising properties associated with at least one parent well and a child well associated with the at least one parent well, divide the input data into a training data subset, a validation data subset, and a test data subset, select at least one machine learning model using the training data subset, the validation data subset, and the test data subset based on k-fold cross validation, tune hyper parameters for each of the at least one machine learning model, and generate a learning output using the at least one machine learning model and the hyper parameters for each of the at least one machine learning model, the learning output indicating a test root-mean-square error (RMSE) and a training RMSE.

According to at least one aspect, an example non-transitory computer-readable storage medium for forecasting well interference is provided. The non-transitory computer-readable storage medium can include instructions which, when executed by one or more processors, cause the one or more processors to perform operations including obtaining input data comprising properties associated with at least one parent well and a child well associated with the at least one parent well, dividing the input data into a training data subset, a validation data subset, and a test data subset, selecting at least one machine learning model using the training data subset, the validation data subset, and the test data subset based on k-fold cross validation, tuning hyper parameters for each of the at least one machine learning model, and generating a learning output using the at least one machine learning model and the hyper parameters for each of the at least one machine learning model, the learning output indicating a test root-mean-square error (RMSE) and a training RMSE.

Hydraulic fracturing treatments can induce complex network geometries, which make evaluating infill child well productivity challenging using physics-based modeling approaches. With decreased cluster spacing and increased treatment size, well production forecasting of infill or child wells can become uncertain as a result of possible interrelated effects of well interference and near-wellbore fracture competition.

Hydraulic fracturing has been widely applied to stimulate unconventional shale reservoirs. Infill or child wells have been recently drilled to produce reservoir volumes that are unstimulated by parent wells. Recent studies have shown that there is improved performance with tighter cluster spacing and shorter stage lengths. However, it is important to understand well interference between an infill child well and corresponding parent wells. Fracture or "frac" hits of the infill wells may induce production loss of the parent wells. Some examples of the physical effects of fracturing a child well which causes a frac hit on a parent well include physical propagation of a fracture from child well to parent well, causing a hydraulic communication between the two, pressure communication from child well to parent well such that reservoir pore pressure at a parent well is affected by the fracture treatment in the child well, and mechanical stress communication between child and parent such that the fracturing operations at the child well causes a stress perturbation to be experienced by a parent well. Other physical effects of fracturing the child well may be experienced by a parent well or may affect the reservoir around a parent well, causing an effect on productivity at the parent. Thus, it is important to understand the root causes and to forecast production for the infill wells so that proper remediation treatments of the parent wells and completion optimization of the infill wells can be provided.

Some examples of stimulation features that could be used to optimize the infill wells and/or the parent wells can include fluid type, fluid volume, additive type and concentration, proppant type, size, concentration, mass, and pumping rate. Some examples of completion features that could be used to optimize the infill wells and/or the parent wells can include perforated length, number of stages, number of perforation clusters. Additional features affecting well production include operator production practices and reservoir or spatial characteristics. The large number of features across numerous wells in a region, location, basin, or country presents the need for large scale complex mathematical and statistical modeling. The relationships and interactions between these and other additional features are not simple.

The modeling, simulation, or prediction insights gained from the various techniques can be useful to well engineers for the parent wells and the child wells. The modeling and predictions can be utilized prior to the start of development of a well site. The information can be used to build a fracturing job design plan or to design an overall multi-well production plan. Once a well site has been started, other models can be used to monitor the progress of the well development and provide insight into modifications or changes to the job design plan that can provide a benefit. The benefit can be decreasing the time frame to reach a production goal, decreasing the cost to develop and work the well during the development and production phases, increasing the projected barrel of oil equivalent (BOE) recovery, and other key performance indicators or measures (KPI).

For example, conventional pumping decisions during hydraulic fracturing operations are generally not governed by data and statistics. Many decisions are subjective to the subject matter expertise (SME) of the fracturing crew. The decision-making process typically has the objective of executing a pre-determined pumping schedule (such as pumping 100,000 pounds (lbs.) of proppant in 50,000 gallons (gal) of fluid at 75 barrels per minute (bpm) for each treatment) or to reacting to catastrophic deviations from expected outcomes (such as lowering the flow rate or prematurely terminating a treatment during a pressure increase caused by a screenout). This fixed and reactive job execution approach does not optimize job results. It seeks to complete the job as designed, with little mechanism for accepting feedback during the job and modifying the design to enhance the outcome.

The disclosure discussed herein can be used to provide a hydraulic fracturing job design or design flow. The job design may include building an optimized model that is based on input parameters and to maximize or optimize well production with design to a designated KPI metric. The job design can balance a maximization of production and minimization of cost and can be optimized for cost, short term production outputs, long term production outputs, and other KPIs. The job design can be utilized by well engineers and operators and by well site equipment.

Physics-based modeling approaches for evaluating infill well production involve fracture propagation geomechanics simulation together with unstructured gridding and reservoir simulation across a large dataset. However, these conventional approaches are computationally expensive and prohibitive. Data-driven approaches have shown great potential in production forecasting and completion optimization with reduced computational costs that allow real-time production forecasting. Some previous solutions were limited because they only used a single model that resulted in overfitting with high variances and/or underfitting with high bias.

The solutions discussed herein based on synthetic datasets derived from authentic data indicate that data-driven models can accurately reproduce the results of conventional reservoir simulators. The building of a reservoir simulator is extremely time consuming and requires a long run time per simulation. As an example, it could take a half an hour to run one simulation. The data-driven models discussed herein can be generated in a much shorter time, an example being a few seconds. Therefore, the data-driven models that are trained from hundreds and thousands of numerical simulations can provide proxies of reservoir simulators and allow production forecasts in real-time applications.

The disclosure discusses a data-driven approach to forecast infill well productivity using parameters related to completion design and well interference. The disclosure includes a system to collect raw data, process the raw data and transform the raw data, perform machine learning model development, perform hyper parameter tuning and model ensemblement for one or more machine learning models, and perform model validation and evaluation. The developed model can be used to predict infill well production more efficiently.

Figure 8:
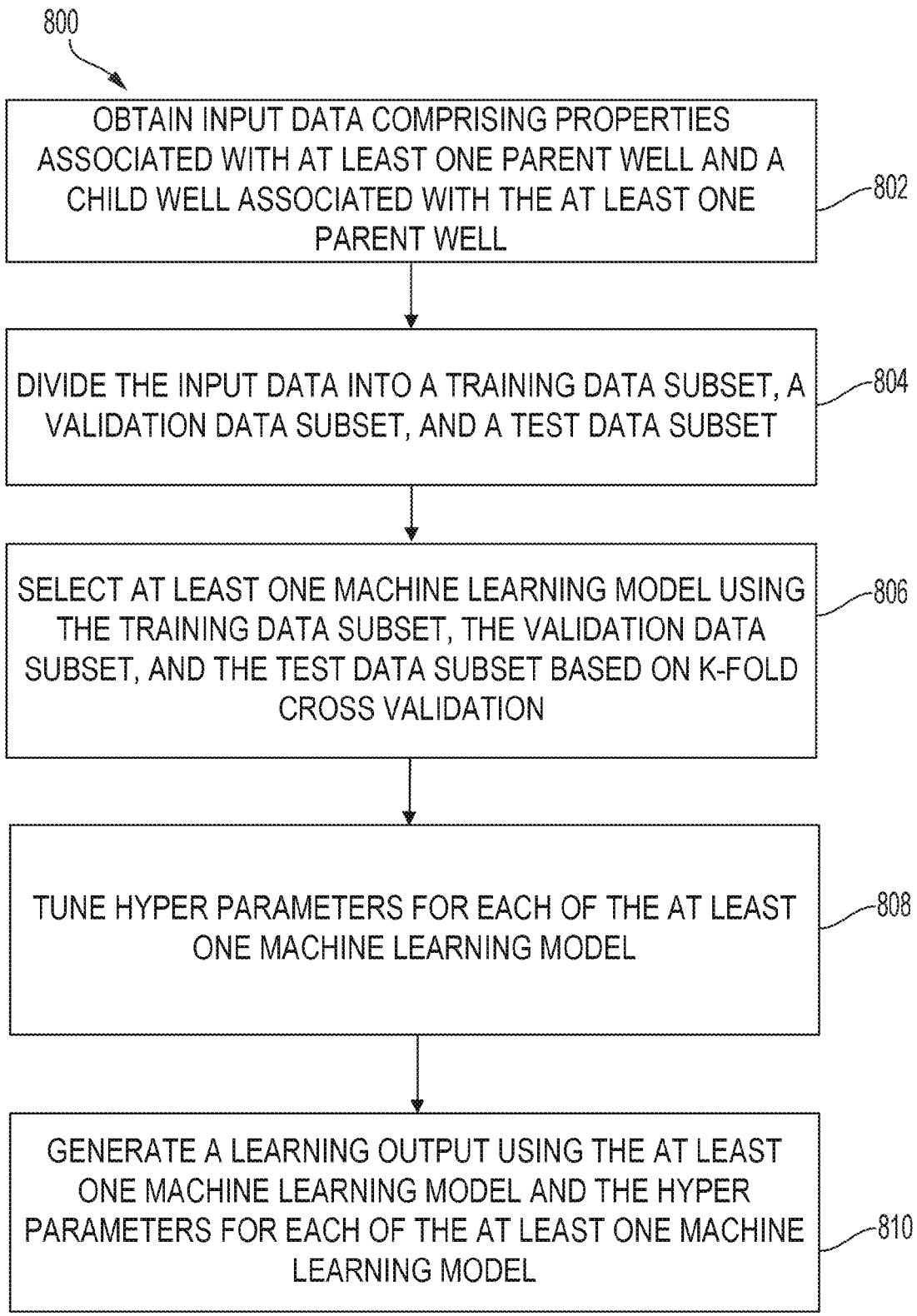
FIG. 8 is a flowchart of an example method for forecasting well interference and predicting infill or child well production efficiently, in accordance with some examples.
Figure 9:
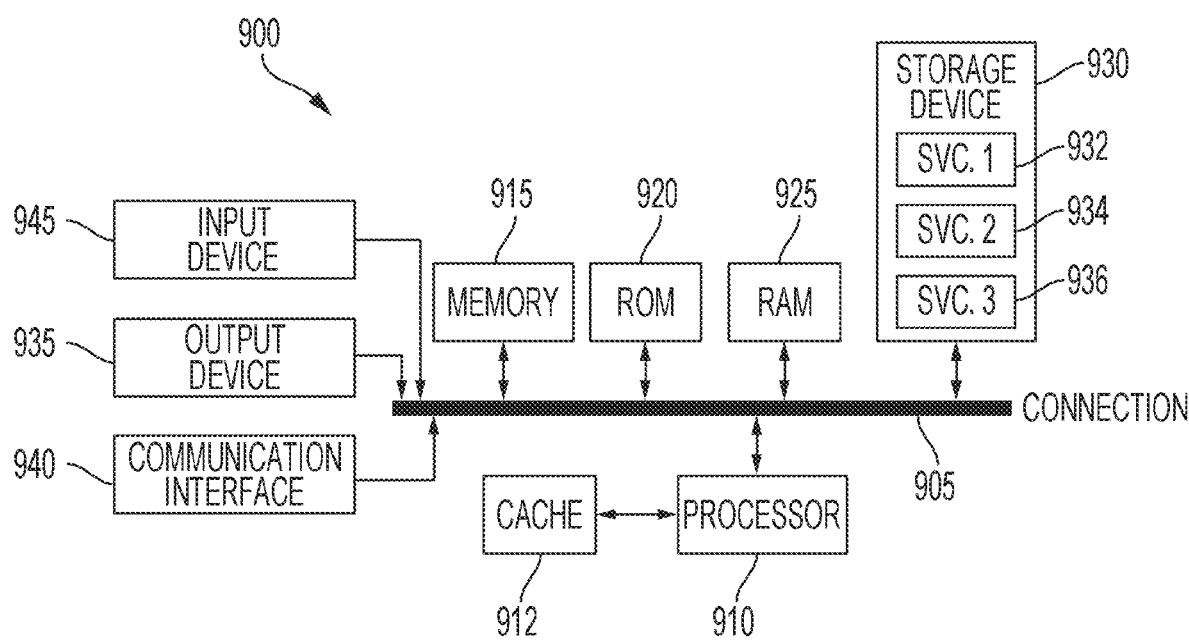
FIG. 9 is a schematic diagram of an example computing device architecture, in accordance with some examples.

As follows, the disclosure will provide a more detailed description of the systems, methods, computer-readable media and techniques herein for forecasting well interference and predicting infill or child well production efficiently. The disclosure will begin with a description of example systems and environments, as shown in FIGS. 1 through 7. A description of example methods and technologies for forecasting well interference and predicting infill or child well production efficiently, as shown in FIG. 8, will then follow. The disclosure concludes with a description of an example computing system architecture, as shown in FIG. 9, which can be implemented for performing computing operations and functions disclosed herein. These variations shall be described herein as the various embodiments are set forth.

FIG. 1 illustrates a schematic view of an embodiment of a wellbore operating environment 100 that may include a well interference system. As depicted in FIG. 1, the operating environment 100 includes a wellbore 114 that penetrates a formation 102 that includes a plurality of formation zones 2, 4, 6, and 8 for the purpose of recovering hydrocarbons, storing hydrocarbons, injecting of water, carbon dioxide, or the like. As depicted in FIG. 1, formation 102 is a subterranean formation, although it is noted that formation 102 may be a subsea formation. The wellbore 114 may extend substantially vertically away from the Earth's surface over a vertical wellbore portion, or may deviate at any angle from the Earth's surface 104 over a deviated or horizontal wellbore portion 118. In alternative operating environments, portions or substantially all of the wellbore 114 may be vertical, deviated, horizontal, and/or curved. The wellbore 114 may be drilled into the formation 102 using any suitable drilling technique. As shown, a drilling or servicing rig 106 disposed at the surface 104 (which may be the surface of the Earth, a seafloor surface, or a sea surface) comprises a derrick 108 with a rig floor 110 through which a tubular string (e.g., a drill string, a tool string, a segmented tubing string, a jointed tubing string, or any other suitable conveyance, or combinations thereof) generally defining an axial flowbore may be positioned within or partially within the wellbore 114. The tubular strings may include two or more concentrically positioned strings of pipe or tubing (e.g., a first work string may be positioned within a second work string). The drilling or servicing rig 106 may be conventional and may include a motor driven winch and other associated equipment for lowering the tubular string into the wellbore 114. Alternatively, a mobile workover rig, a wellbore servicing unit (e.g., coiled tubing units), or the like may be used to lower the work string into the wellbore 114. In such an environment, the tubular string may be utilized in drilling, stimulating, completing, or otherwise servicing the wellbore, or combinations thereof. A drilling or servicing rig 106 may be comprised of other equipment.

While FIG. 1 depicts a stationary drilling rig 106, one of ordinary skill in the art will readily appreciate that mobile workover rigs, wellbore servicing units (such as coiled tubing units), and the like may be employed. In the context of subsea environments and/or subsea formations, one of ordinary skill in the art will appreciate that conventional fixed platforms, vertically moored platforms, spar platforms, semi-submersible platforms, floating production facilities, and sub-sea completion facilities and the like may be employed. It is noted that while the Figures or portions thereof may exemplify horizontal or vertical wellbores, the principles of the presently disclosed apparatuses, methods, and systems, may be similarly applicable to horizontal wellbore configurations, conventional vertical wellbore configurations, deviated wellbore configurations, and any combinations thereof. Therefore, the horizontal, deviated, or vertical nature of any figure is not to be construed as limiting the wellbore to any particular configuration or formation.

As depicted in FIG. 1, at least a portion of the wellbore 114 is lined with a wellbore tubular 120 such as a casing string and/or liner defining an axial flowbore 121. In at least some instances, one or more packer assemblies 200, such as a first packer assembly 200a, second packer assembly 200b, third packer assembly 200c, and fourth packer assembly 200d, may be disposed within the wellbore 114. In some instances, the one or more packer assemblies 200 may be used to isolate two or more adjacent portions or zones within formation 102 and/or wellbore 114. In some cases, the one or more packer assemblies 200 are operable to engage and/or seal against an outer tubular string such as tubular string 120. According to at least one aspect of the present disclosure, at least a portion of the wellbore tubular 120 is secured into position against the formation 102 via a plurality of packer assemblies 200, such as assemblies 200a-200d. In at least some instances, a portion of the wellbore tubular 120 may be partially secured into position against the formation 102 via cement, e.g. when wellbore tubular 120 is a casing.

As depicted in FIG. 1, the operating environment 100 may further include at least one downhole tool 300 (e.g., a first downhole tool 300a, a second downhole tool 300b, a third downhole tool 300c, and a fourth downhole tool 300d). The downhole tools may be any variety of downhole tools such as a plug, a sleeve, a valve, a piston, a sensor, or an actuator to inflate the packers 200, or other devices. The operating environment 100 may include a system for forecasting well interference.

Disclosed herein are systems and methods for generating a data-driven approach to forecast infill or child well productivity. A well interference system may utilize input data and parameters related to completion design and well interference including raw data collection, data processing and transformation, machine learning model development, hyper parameter tuning and model ensemblement, and model validation and evaluation. The trained and developed machine learning model can be used to predict infill or child well production efficiently and be used for real-time applications.

During raw data collection, input features are obtained including parent-child well spacing, production start time difference, cumulative production of parent and child wells, proppant mass, lateral length, fluid volume, and latitude and longitude of the wells, among other information. Next, the system performs feature transformation and model selection from a number of machine learning algorithms. After the machine learning algorithms are selected, hyper parameter tuning and model ensemblement is performed to select the top performing models. Bias-variance tradeoff curves are generated to evaluate ensembled model performance and to provide guidance on further model improvement.

As a result, the system can be used to enhance pre-job or real-time completion design and optimization for infill child wells. By using sensitivity analysis of input parameters, an optimized completion design can be determined to maximize well production of the infill child wells.

In a first step, raw data may be collected from public databases or data sources. The raw data may be field data associated with oil fields such as field data from the Permian basin. In one example, 15,724 wells and their associated data were analyzed to extract preliminary features such as latitude, longitude, azimuth, well depth, lateral length, production start date, cumulative barrel of oil equivalent (BOE) production, treatment completion fluid volume, and proppant mass.

The raw data may include a table or database that includes child well production information for one or more child wells, a true vertical depth of the child wells, a latitude of the child wells, a longitude of the child wells, a lateral length of the child wells, a fluid volume associated with the child wells, and a proppant mass associated with the child wells. In addition, the raw data may include another table or database that includes parent well information. This table may include a horizontal or a vertical distance from a first parent well to an associated child well, a time in days between production of the first parent well and the associated child well, a production of the first parent well, a horizontal or a vertical distance from a second parent well to the associated child well, a time in days between production of the second parent well and the associated child well, and a production of the second parent well.

Next, after the input data is collected from the public databases and data sources, machine learning model development is performed. As an example, the input dataset from the 15,724 wells may include 1,155 rows of data associated with fully-bounded child wells after data preprocessing and cleaning. The data may be separated into training and test datasets at a ratio of 0.8. For the training data subset of 924 rows of data, k-fold cross validation, such as five-fold cross validation, may be performed and RMSE may be used as an evaluation metric for one or more machine learning algorithms to select the higher or highest performing machine learning algorithms. The machine learning algorithms also could be analyzed using adjusted R-square or mean absolute percentage error (MAPE), among others.

The machine learning algorithms may be categorized into a number of categories including Multinomial Logistic Regression (MLR), polynomial, kernel-based, tree-based, and others that do not fit into those categories. The MLR algorithms may include MLR, MLR with Ridge regularization, MLR with Lasso regularization, and MLR with Elastic Net regularization. The polynomial algorithms may include PolynomialFeatures (2)+Linear Regressor, PolynomialFeatures (2)+Ridge, PolynomialFeatures (2)+Lasso, and PolynomialFeatures (2) Elastic Net. The kernel-based algorithms may include SVR (kernel=SVR (kernel='poly', degree=2), SVR (kernel='rbf'), Kernel Ridge (kernel='polynomial', degree=3), and Kernel Ridge (kernel='rbf'). The tree-based algorithms may include Decision Tree Regressor, Random Forest Regressor, Extra Trees Regressor, AdaBoost Regressor, XGBoost Regressor, and GBoost Regressor. The other algorithms may include Huber Regressor (i.e., an algorithm that is a linear regressor model robust to outliers), RANSAC, SGD Regressor, Theil Sen Regressor, ARD Regressor, KNN Regressor, Bagging Regressor, and Bayesian Ridge.

The machine learning models may receive the input data and may be analyzed using k-fold cross validation, where as an example five-fold cross validation is used. Based on the cross validation metrics such as Adjusted R-square or MAPE, three models may be selected and an ensemble model created. However, in other situations other models could be selected and the ensemble could be configured from less than three models or more than three models. As an example, two models could be ensembled, five models could be ensembled, or one model could be used alone. Model ensembling may combine various machine learning models to further reduce the variance errors and to create a more stable and accurate model. The models may be analyzed using sklearn.model_selection.GridSearchCV or another method.

As an example, the selected models may include XGBoost Regressor, GBoost Regressor, and PolynomialFeatures (2)/Elastic Net. These models were selected based on their low RMSE. Grid search cross validation (i.e., GridSearchCV) may be used to optimize hyper parameters by using a cross-validated grid search over a parameter grid.

As an example, for XGBoost Regressor, the hyper parameters may include learning_rate [0.0075, 0.01, 0.012], n_estimators: [500, 550, 600], max_depth: [6, 7, 8], colsample_bytree: [0.6], subsample: [0.7], and reg_lambda: [0.018, 0.02, 0.025]. By fitting five folds for each of the candidates, optimized parameter values can be determined from the lowest k-fold cross validation RMSEs.

According to an example, the system may use a weighted average of the model as a final output ensemble model. GridSearchCV can be used to tune the weights of each model that results in an ensemble weighting ratio of 3:1:1 for XGBoost Regressor, GBoost Regressor, and PolynomialFeatures (2)/Elastic Net, respectively. The system also could use other methods to determine the final output ensemble model such as random search methodologies or optimization methodologies. These are examples and other methods may be used to tune the model hyper parameters and the ensemble weights.

After tuning the hyper parameters of the three models and the weights of the ensemble model, a learning curve can be generated. According to an example, the learning curve shows that test error (i.e., model variances) to be approximately 38,600 BOE. Training error (i.e., model bias) is shown to be approximately 19,000 BOE as a result of completion and reservoir related features.

Figure 2:
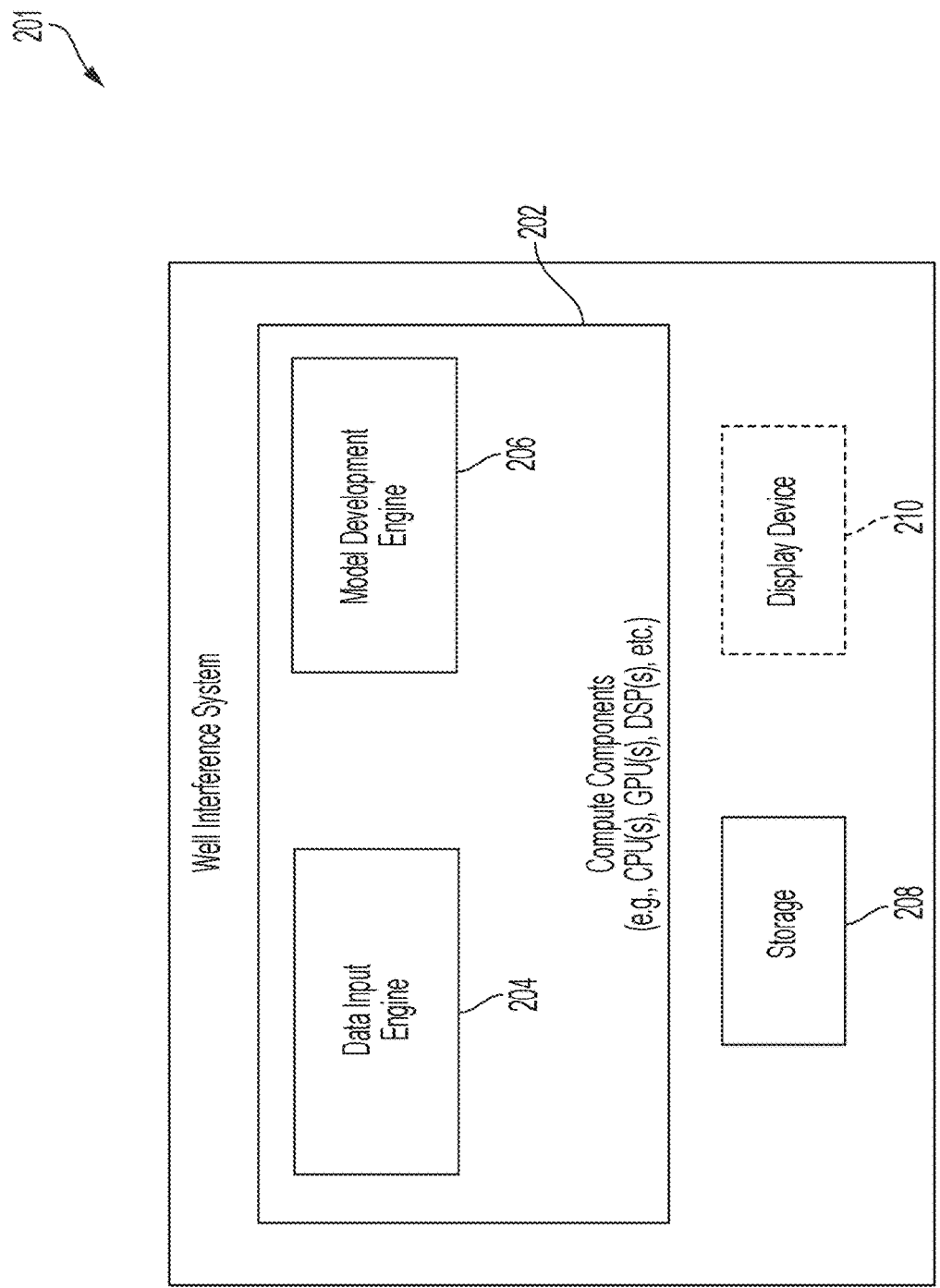
FIG. 2 is a block diagram of the well interference system that may be implemented to forecast well interference, in accordance with some examples.

FIG. 2 illustrates a well interference system 201 according to an example. The well interference system 201 can be implemented for predicting infill or child well production efficiently as described herein. In this example, the well interference system 201 can include compute components 202, a data input engine 204, a model development engine 206, and a storage 208. In some implementations, the well interference system 201 can also include a display device 210 for displaying data and graphical elements such as images, videos, text, simulations, and any other media or data content.

The well interference system 201 may be physically located at the wellbore operating environment 100. Components of the well interference system 201 may be located downhole and/or on the surface. In addition, the well interference system 201 may be executed by a computing device such as compute components 202 located downhole and/or on the surface. In one example, the well interference system 201 may be executed by one or more server computing devices such as a cloud computing device in communication with the well productivity system 201.

The well interference system 201 can be part of, or implemented by, one or more computing devices, such as one or more servers, one or more personal computers, one or more processors, one or more mobile devices (for example, a smartphone, a camera, a laptop computer, a tablet computer, a smart device, etc.), and/or any other suitable electronic devices. In some cases, the one or more computing devices that include or implement the well interference system 201 can include one or more hardware components such as, for example, one or more wireless transceivers, one or more input devices, one or more output devices (for example, display device 210), the one or more sensors (for example, an image sensor, a temperature sensor, a pressure sensor, an altitude sensor, a proximity sensor, an inertial measurement unit, etc.), one or more storage devices (for example, storage system 208), one or more processing devices (for example, compute components 202), etc.

As previously mentioned, the well interference system 201 can include compute components 202. The compute components can be used to implement the data input engine 204, the model development engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The data input engine 204 can be used to obtain data, process data, analyze data, and store data in one or more databases. The databases may be stored in the storage 208 or in another location.

As an example, the data input engine 204 may receive oil field data such as data associated with the Permian basin or data associated with one or more oil fields located in other areas. The data input engine 204 may receive data associated with one or more wells such as latitude, longitude, azimuth, well depth, lateral length, production start date, cumulative BOE production, fluid volume information for the well, and proppant mass for the well.

The data can be divided into data associated with child wells and data associated with parent wells that are associated with the child wells. The child well information can include production information for the well, a true vertical depth of the well, a latitude of the well, a longitude of the well, a lateral length of the well, a fluid volume for the well, and a proppant mass for the well. The parent well information can include a first parent well horizontal or vertical distance or well spacing from the child well, a time in days that the child well produces after the start of production of the first parent well, a production of the first parent well, a second parent well horizontal or vertical distance or well spacing from the child well, a time in days that the child well produces after the start of production of the second parent well, and a production of the second parent well. The data or information may be associated with fully-bounded child wells and/or data or information associated with half-bounded (i.e., partially-bounded) child wells.

After the data is obtained by the data input engine 204, the model development engine 206 can begin machine learning model development. As an example, the input dataset may include a number of rows of data associated with the fully-bounded child wells and the model development engine 206 can perform preprocessing and cleaning on the data. The data can be separated into a training data subset and a test data subset based on a ratio or percentage. As an example, the training data may include 80% of the data and the test data may include 20% of the data. In other words, the ratio may be 0.8. For the training data subset, the model development engine may perform k-fold cross validation using RMSE as an evaluation metric over one or more machine learning algorithms.

The machine learning algorithms may be categorized into a number of categories including Multinomial Logistic Regression (MLR), polynomial, kernel-based, tree-based, and others that do not fit into those categories. The MLR algorithms may include MLR, MLR with Ridge regularization, MLR with Lasso regularization, and MLR with Elastic Net regularization. The polynomial algorithms may include PolynomialFeatures (2)+Linear Regressor, PolynomialFeatures (2)+Ridge, PolynomialFeatures (2)+Lasso, and PolynomialFeatures (2) Elastic Net. The kernel-based algorithms may include SVR (kernel=SVR (kernel='poly', degree=2), SVR (kernel='rbf'), Kernel Ridge (kernel='polynomial', degree=3), and Kernel Ridge (kernel='rbf'). The tree-based algorithms may include Decision Tree Regressor, Random Forest Regressor, Extra Trees Regressor, AdaBoost Regressor, XGBoost Regressor, and GBoost Regressor. The other algorithms may include Huber Regressor (i.e., an algorithm that is a linear regressor model robust to outliers), RANSAC, SGD Regressor, Theil Sen Regressor, ARD Regressor, KNN Regressor, Bagging Regressor, and Bayesian Ridge.

Figure 6:
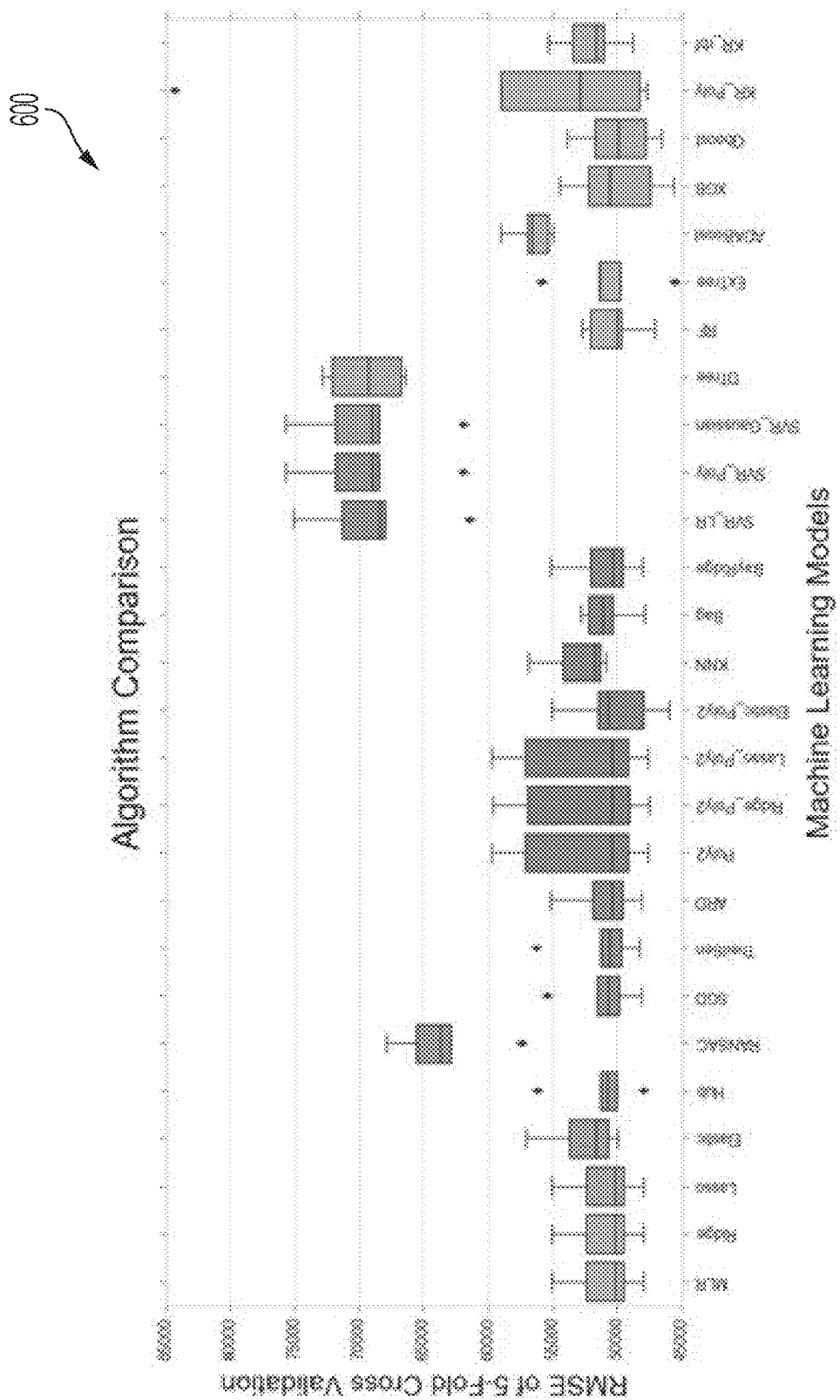
FIG. 6 is a diagram of a comparison of machine learning models used by the well interference system, in accordance with some examples.

The model development engine 206 may send the input data from the input data engine 204 and the models may be analyzed using k-fold cross validation using GridSearchCV or another method. Based on the cross validation RMSE scores, a number of models can be selected and an ensemble model can be created. An example of five-fold cross validation scores is shown in FIG. 6 and discussed below. Model ensembling may combine various machine learning models to further reduce the variance errors and to create a more stable and accurate model.

According to an example, the model development engine 206 can select XGBoost Regressor, GBoost Regressor, and PolynomialFeatures (2)/Elastic Net. These models were selected based on their low RMSE. Grid search cross validation (i.e., GridSearchCV) may be used by the model development engine 206 to optimize hyper parameters by using a cross-validated grid search over a parameter grid.

As an example, for XGBoost Regressor, the hyper parameters may include learning_rate [0.0075, 0.01, 0.012], n_estimators: [500, 550, 600], max_depth: [6, 7, 8], colsample_bytree: [0.6], subsample: [0.7], and reg_lambda: [0.018, 0.02, 0.025]. By fitting five folds for each of the candidates, optimized parameter values can be determined from the lowest k-fold cross validation RMSEs.

According to an example, the system may use a weighted average of the model as a final output ensemble model. GridSearchCV can be used to tune the weights of each model that results in an ensemble weighting ratio of 3:1:1 for XGBoost Regressor, GBoost Regressor, and Polynomial- Features (2)/Elastic Net, respectively. This is an example and other methods may be used to tune the model hyper parameters and the ensemble weights.

After tuning the hyper parameters of the three models and the weights of the ensemble model, a learning curve can be generated by the model development engine 206. The learning curve can show that test error (i.e., model variances) is approximately 38,600 BOE. Training error (i.e., model bias) is shown to be approximately 19,000 BOE as a result of completion and reservoir related features.

The storage 208 can be any storage device(s) for storing data. In some examples, the storage 208 can include a buffer or cache for storing data for processing by the compute components 202. Moreover, the storage 208 can store data from any of the components of the well interference system 201. For example, the storage 208 can store input data used by the well interference system 201, outputs or results generated by the well interference system 201 (for example, data and/or calculations from the data input engine 204, the model development engine 206, etc.), user preferences, parameters and configurations, data logs, documents, software, media items, GUI content, and/or any other data and content.

While the well interference system 201 is shown in FIG. 2 to include certain components, one of ordinary skill in the art will appreciate that the well interference system 201 can include more or fewer components than those shown in FIG. 2. For example, the well interference system 201 can also include one or more memory components (for example, one or more RAMs, ROMs, caches, buffers, and/or the like), one or more input components, one or more output components, one or more processing devices, and/or one or more hardware components that are not shown in FIG. 2.

Figure 3:
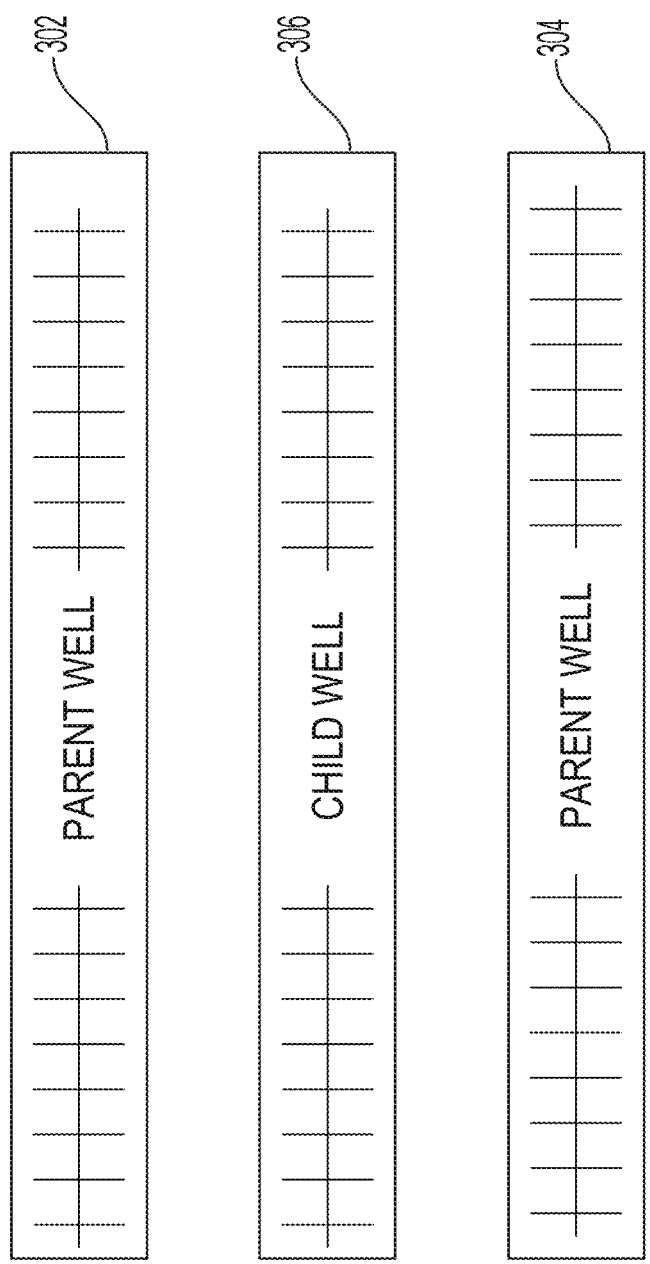
FIG. 3 shows an overhead view of example wells that can be analyzed by the well interference system, in accordance with some examples.

FIG. 3 illustrates an overhead view (i.e., plan view or map view) of example wells that can be analyzed by the well interference system 201 according to an example. The wells 302, 304, and 306 shown in FIG. 3 are horizontal wells or horizontal portions of the wells and their associated example fracture geometries are also shown. As shown in FIG. 3, an example first parent well 302 and an example second parent well 304 are shown and a single child well 306 is shown oriented horizontally between the first parent well 302 and the second parent well 304. The child well 306 is known as a fully-bounded child well because it is arranged between two parent wells, one on each side. However, the child wells that can be analyzed by the well interference system 201 also can be half-bounded child wells (i.e., a well only having one parent well). The child and parent wells may be oriented vertically at essentially the same depth, which is on essentially the same horizontal plane within the formation 102 or may be oriented at different depths.

Figure 4:
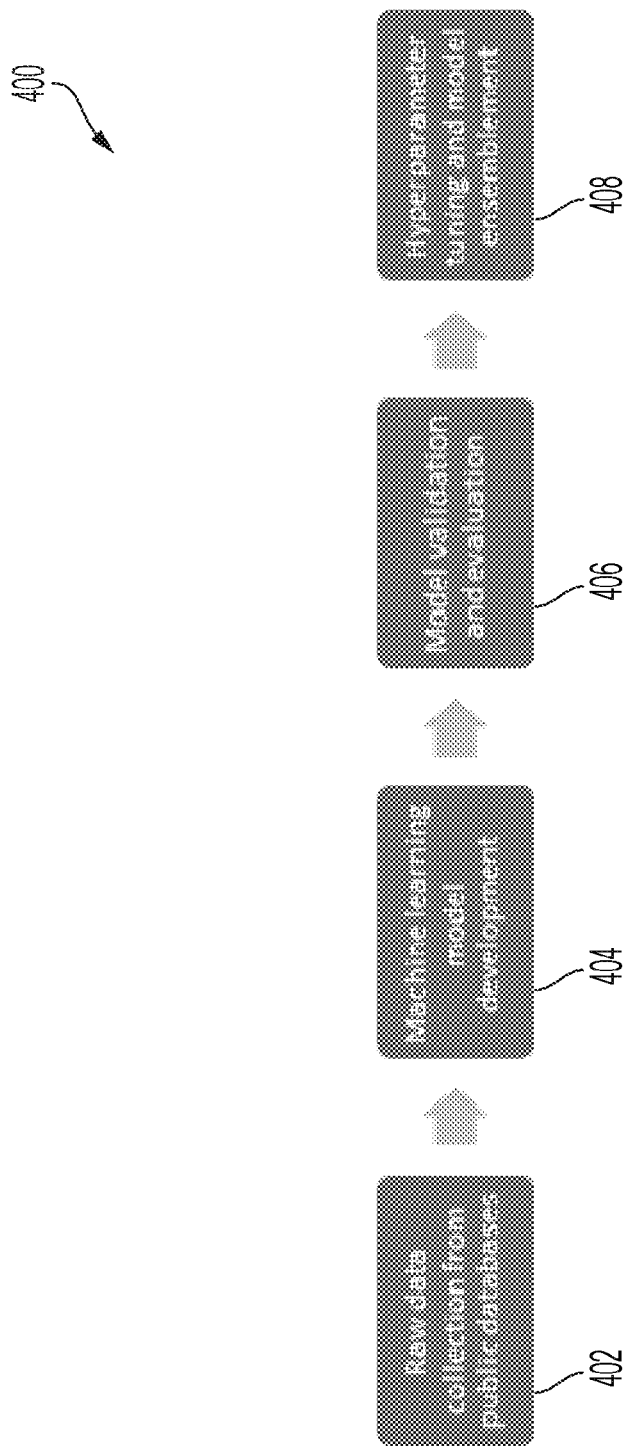
FIG. 4 is a flow diagram for the well interference system, in accordance with some examples.

FIG. 4 illustrates a flow diagram 400 for the well interference system 201 according to an example. As shown in FIG. 4, at step 402 the well interference system 201 can collect or obtain raw data from public databases and public sources of information. The well interference system 201 can collect other information in addition to the raw data from the public databases such as data from private sources or proprietary sources.

Next, at step 404, the well interference system 201 can perform machine learning model development. At step 406, the well interference system can perform model validation and evaluation to select one or more models that provide best results associated with the raw data from the public databases. The one or more models may be selected based on their RMSE and/or other factors. After the models are validated and evaluated and models are selected, in step 408, the well interference system 201 can perform hyper parameter tuning and model ensemblement on the selected models.

FIG. 5 shows two different tables including a first table 502 that shows example rows from a field dataset from Permian wells and fracture jobs. A second table 504 shows example rows from the field dataset from the Permian wells and fracture jobs. As noted herein, the data may include a table or database that includes child well production information for a child well, a true vertical depth of the child well, a latitude of the child well, a longitude of the child well, a lateral length of the child well, a fluid volume associated with the child well, and a proppant mass associated with the child well. In addition, the raw data may include another table or database that includes parent well information. This table may include a horizontal or a vertical distance from a first parent well to the child well, a time in days between production of the first parent well and the child well, a production of the first parent well, a horizontal or a vertical distance from a second parent well to the child well, a time in days between production of the second parent well and the child well, and a production of the second parent well. Additional data describing the child well and its environment may be included in table 502 and carried forward into the machine learning modeling process, such as additional wellbore physical characteristics, reservoir parameters, stimulation treatment design parameters, and production parameters.

The first table 502 and the second table 504 show five example rows from the dataset. Each row represents one child (C1) and two parent wells (P1 and P2). The child well and the parent wells may be approximately parallel to one another. The parent wells may have production prior to the child well. The first table 502 shows properties associated with the child well including, for example for Case #1, child well production over a period of time (i.e., six months), true vertical depth (TVD) (i.e., 8780 feet), latitude (i.e., 33.0) and longitude (i.e., −103.8) of the mid-point of the well lateral, lateral length (i.e., 4130 feet), treatment slurry fluid volume (i.e., 10.6 MMgal (millions of gallons)), and proppant mass of all stages (i.e., 9.8 MMlb. (millions of pounds)). The second table 504 shows properties associated with the corresponding two parent wells. As an example, the second table 504 shows for Case #1 well spacing between the first parent well (P1) and the child well (i.e., 1330 feet). The child well begins to produce two hundred and forty days after the start of the production of the parent well. During that two hundred and forty day period, the first parent well produces 63.1 MBOE (thousands of BOE). The second parent well (P2), located 1210 feet away on the opposite side of the child well, produces 13.9 MBOE during a period of sixty days before the start of the production by the child well. Although this example shows data associated with a fully-bounded child well (i.e. a child having a parent well on each size), the data could also include data associated with half-bounded child wells (i.e., a child well having only one parent well). Additional data describing the parent wells and their environment may be included in table 504 and carried forward into the machine learning modeling process, such as additional wellbore physical characteristics, reservoir parameters, stimulation treatment design parameters, production parameters, and location parameters relative to the child well.

FIG. 6 illustrates a diagram 600 of a comparison of machine learning models used by the well interference system, in accordance with an example. FIG. 6 shows a five-fold cross validation RMSE score for each of the machine learning models. In an example, three of the machine learning models are chosen because they have a lowest RMSE. The three chosen machine learning models are XGBoost Regressor, GBoost Regressor, and PolynomialFeatures (2)/Elastic Net. In addition, the models can be ensembled to further reduce variance errors and create a more stable and accurate model.

Figure 7:
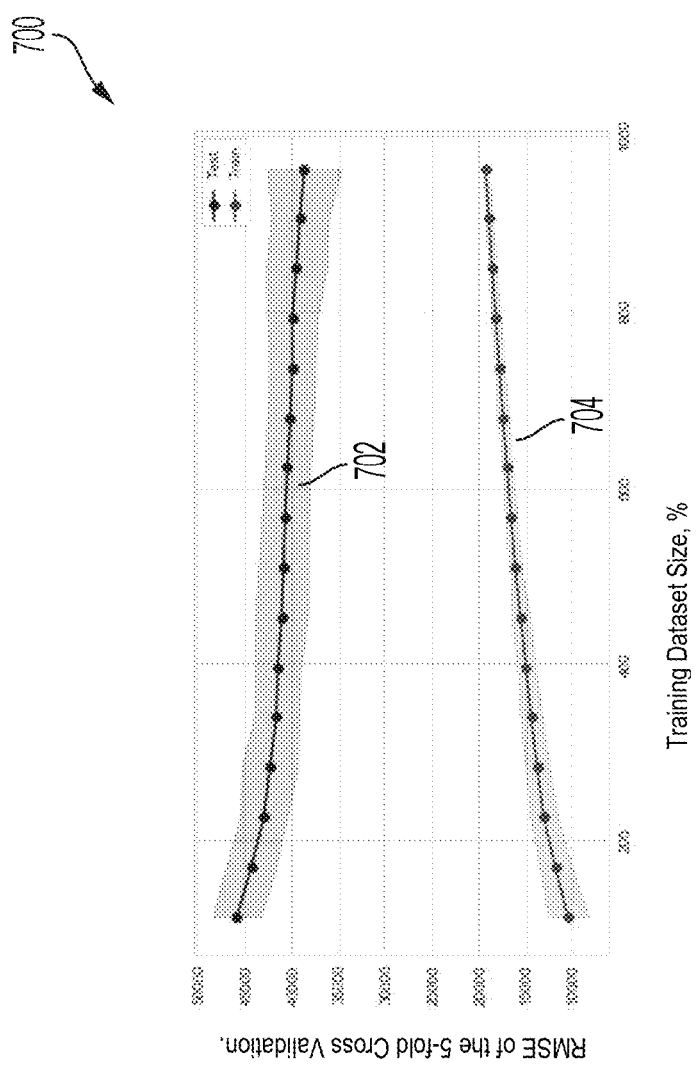
FIG. 7 is a diagram of output data of the well interference system, in accordance with some examples.

FIG. 7 shows a diagram 700 of output data of the well interference system 201, in accordance with an example. After tuning the hyper parameters of the selected models and the weights of the ensemble model, a learning curve can be generated as shown in FIG. 7. FIG. 7 shows a first curve 702 that indicates that test errors (i.e., model variances) are around 38,600 BOE. FIG. 7 also shows a second curve 704 that indicates training errors or model bias that is around 19,000 BOE as a result of completion and reservoir related features.

After the one or more models are selected and tuned, the one or more ensemble models may be deployed to a server computing device such as a cloud computing device including the virtual private cloud.

FIG. 8 illustrates an example method 800 for forecasting well interference and predicting infill or child well production efficiently. For the sake of clarity, the method 800 is described in terms of the well interference system 201, as shown in FIG. 2, configured to practice the method. The steps outlined herein are exemplary and can be implemented in any combination thereof, including combinations that exclude, add, or modify certain steps.

At step 802, the well interference system 201 can obtain input data comprising properties associated with at least one parent well and a child well associated with the at least one parent well. The child well can be a fully-bounded child well or the child well can be a half-bounded child well. The properties associated with the at least one parent well and the child well may include at least one of well production over a period of time, fluid type, fluid volume, additive type, additive concentration, proppant type, proppant size, proppant concentration, proppant mass, and pumping rate. The properties associated with the at least one parent well and the child well also may include well spacing between the at least one parent well and the child well. The properties also may include a period of time between when the at least one parent well begins to produce and the child well begins to produce.

At step 804, the well interference system 201 can divide the input data into a training data subset, a validation data subset, and a test data subset. As an example, the training data may include 80% of the data and the test data may include 20% of the data. In other words, the ratio may be 0.8. For the training data subset, the model development engine may perform k-fold cross validation using RMSE as an evaluation metric over one or more machine learning algorithms.

At step 806, the well interference system 201 can select at least one machine learning model using the training data subset, the validation data subset, and the test data subset based on k-fold cross validation. As an example, the selected machine learning models may include, but is not limited to, XGBoost Regressor, GBoost Regressor, and Polynomial-Features (2)/Elastic Net. These models may be selected as having the best RMSE. The machine learning models also may be a combined ensembled model. As an example, the at least one machine learning model may be an ensemble model having a weighting ratio of three parts XGBoost Regressor, one part GBoost Regressor, and one part PolynomialFeatures (2)/Elastic Net.

At step 808, the well interference system 201 can tune hyper parameters for each of the at least one machine learning model. As an example, for XGBoost Regressor, the hyper parameters may include learning_rate [0.0075, 0.01, 0.012], n_estimators: [500, 550, 600], max_depth: [6, 7, 8], colsample_bytree: [0.6], subsample: [0.7], and reg_lambda: [0.018, 0.02, 0.025]. By fitting five folds for each of the candidates, optimized parameter values can be determined from the lowest k-fold cross validation RMSEs.

At step 810, the well interference system 201 can generate a learning output using the at least one machine learning model and the hyper parameters for each of the at least one machine learning model. The learning output can indicate a test root-mean-square error (RMSE) and a training RMSE for the at least one machine learning model and may be displayed on the display 210 as part of a graphical user interface. The well interference system 201 can be used to predict well production for the at least one parent well and the child well using the at least one machine learning model.

As a result, the well interference system 201 can be used to investigate and determine the effect of completion design, reservoir properties, and parent well interference on child well productivity. Completion and reservoir properties have been found to control production performance of child wells. The ensembled model discussed herein provides the best performance and a lowest root mean square error (RMSE) for the example features considered. Thus, the well interference system 201 can provide a data-driven approach to production forecasting without the limitations of numerical simulation. In one example, the well interference system 201 may provide recommendations and suggestions related to completion related parameters such as lateral length, fluid type, fluid volume, additive type, additive concentration, proppant type, proppant size, proppant concentration, proppant mass, and pumping rate to be used in the child well and/or the one or more parent wells.

Having disclosed example systems, methods, and technologies for activating or triggering one or more downhole tools or memory devices based at least in part on one or more surface cues and sensed downhole activities, the disclosure now turns to FIG. 9, which illustrates an example computing device architecture 900 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

FIG. 9 illustrates an example computing device architecture 900 of a computing device which can implement the various technologies and techniques described herein. For example, the computing device architecture 900 can implement the system 201 shown in FIG. 2 and perform various steps, methods, and techniques disclosed herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (for example, microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising obtaining, by at least one processor, input data comprising properties associated with at least one parent well and a child well associated with the at least one parent well, dividing, by the at least one processor, the input data into a training data subset, a validation data subset, and a test data subset, selecting, by the at least one processor, at least one machine learning model using the training data subset, the validation data subset, and the test data subset based on k-fold cross validation, tuning, by the at least one processor, hyper parameters for each of the at least one machine learning model, and generating, by the at least one processor, a learning output using the at least one machine learning model and the hyper parameters for each of the at least one machine learning model, the learning output indicating a test root-mean-square error (RMSE) and a training RMSE Statement 2: A method according to Statement 1, wherein the at least one machine learning model comprises XGBoost Regressor, GBoost Regressor, and PolynomialFeatures (2)/Elastic Net.

Statement 3: A method according to any of Statements 1 and 2, wherein the at least one machine learning model comprises an ensemble model having a weighting ratio of three parts XGBoost Regressor, one part GBoost Regressor, and one part PolynomialFeatures (2)/Elastic Net.

Statement 4: A method according to any of Statements 1 through 3, further comprising predicting well production for the at least one parent well and the child well using the at least one machine learning model.

Statement 5: A method according to any of Statements 1 through 4, wherein the properties associated with the at least one parent well and the child well comprise at least one of well production over a period of time, fluid type, fluid volume, additive type, additive concentration, proppant type, proppant size, proppant concentration, proppant mass, and pumping rate.

Statement 6: A method according to any of Statements 1 through 5, wherein the properties associated with the at least one parent well and the child well comprise well spacing between the at least one parent well and the child well.

Statement 7: A method according to any of Statements 1 through 6, wherein the properties associated with the at least one parent well and the child well comprise a period of time between when the at least one parent well begins to produce and the child well begins to produce.

Statement 8: A method according to any of Statements 1 through 7, wherein the child well is a fully-bounded child well.

Statement 9: A method according to any of Statements 1 through 8, wherein the child well is a half-bounded child well.

Statement 10: A system comprising, at least one processor coupled with at least one computer-readable storage medium having stored therein instructions which, when executed by the at least one processor, causes the system to: obtain input data comprising properties associated with at least one parent well and a child well associated with the at least one parent well, divide the input data into a training data subset, a validation data subset, and a test data subset, select at least one machine learning model using the training data subset, the validation data subset, and the test data subset based on k-fold cross validation, tune hyper parameters for each of the at least one machine learning model, and generate a learning output using the at least one machine learning model and the hyper parameters for each of the at least one machine learning model, the learning output indicating a test root-mean-square error (RMSE) and a training RMSE.

Statement 11: A system according to Statement 10, wherein the at least one machine learning model comprises XGBoost Regressor, GBoost Regressor, and PolynomialFeatures (2)/Elastic Net.

Statement 12: A system according to any of Statements 10 and 11, wherein the at least one machine learning model comprises an ensemble model having a weighting ratio of three parts XGBoost Regressor, one part GBoost Regressor, and one part PolynomialFeatures (2)/Elastic Net.

Statement 13: A system according to any of Statements 10 through 12, the at least one processor further to predict well production for the at least one parent well and the child well using the at least one machine learning model.

Statement 14: A system according to any of Statements 10 through 13, wherein the properties associated with the at least one parent well and the child well comprise at least one of well production over a period of time, fluid type, fluid volume, additive type, additive concentration, proppant type, proppant size, proppant concentration, proppant mass, and pumping rate.

Statement 15: A system according to any of Statements 10 through 14, wherein the properties associated with the at least one parent well and the child well comprise well spacing between the at least one parent well and the child well.

Statement 16: A system according to any of Statements 10 through 15, wherein the properties associated with the at least one parent well and the child well comprise a period of time between when the at least one parent well begins to produce and the child well begins to produce.

Statement 17: A system according to any of Statements 10 through 16, wherein the child well is a fully-bounded child well.

Statement 18: A system according to any of Statements 10 through 17, wherein the child well is a half-bounded child well.

Statement 19: A non-transitory computer-readable storage medium comprising instructions stored on the non-transitory computer-readable storage medium, the instructions, when executed by one more processors, cause the one or more processors to perform operations including: obtaining input data comprising properties associated with at least one parent well and a child well associated with the at least one parent well, dividing the input data into a training data subset, a validation data subset, and a test data subset, selecting at least one machine learning model using the training data subset, the validation data subset, and the test data subset based on k-fold cross validation, tuning hyper parameters for each of the at least one machine learning model, and generating a learning output using the at least one machine learning model and the hyper parameters for each of the at least one machine learning model, the learning output indicating a test root-mean-square error (RMSE) and a training RMSE.

Statement 20: A non-transitory computer-readable storage medium according to Statement 19, the operations further comprising predicting well production for the at least one parent well and the child well using the at least one machine learning model.

Statement 21: A system comprising means for performing a method according to any of Statements 1 through 9.

We claim:

1. A method comprising:
   obtaining, by at least one processor, input data comprising properties associated with at least one parent well and a child well associated with the at least one parent well;
   dividing, by the at least one processor, the input data into a training data subset, a validation data subset, and a test data subset;
   selecting, by the at least one processor, at least one machine learning model using the training data subset, the validation data subset, and the test data subset based on k-fold cross validation;
   tuning, by the at least one processor, hyper parameters for each of the at least one machine learning model; and
   generating, by the at least one processor, a learning output using the at least one machine learning model and the hyper parameters for each of the at least one machine learning model, the learning output indicating a test root-mean-square error (RMSE) and a training RMSE, wherein the output is used to predict well interference between the at least one parent well and the child well.

2. The method of claim 1, wherein the at least one machine learning model comprises XGBoost Regressor, GBoost Regressor, and PolynomialFeatures (2)/Elastic Net.

3. The method of claim 1, wherein the at least one machine learning model comprises an ensemble model having a weighting ratio of three parts XGBoost Regressor, one part GBoost Regressor, and one part PolynomialFeatures (2)/Elastic Net.

4. The method of claim 1, further comprising predicting well production for the at least one parent well and the child well using the at least one machine learning model.

5. The method of claim 1, wherein the properties associated with the at least one parent well and the child well comprise at least one of well production over a period of time, fluid type, fluid volume, additive type, additive concentration, proppant type, proppant size, proppant concentration, proppant mass, and pumping rate.

6. The method of claim 1, wherein the properties associated with the at least one parent well and the child well comprise well spacing between the at least one parent well and the child well.

7. The method of claim 1, wherein the properties associated with the at least one parent well and the child well comprise a period of time between when the at least one parent well begins to produce and the child well begins to produce.

8. The method of claim 1, wherein the child well is a fully-bounded child well.

9. The method of claim 1, wherein the child well is a half-bounded child well.

10. A system comprising:
at least one processor coupled with at least one computer-readable storage medium having stored therein instructions which, when executed by the at least one processor, causes the system to:
obtain input data comprising properties associated with at least one parent well and a child well associated with the at least one parent well;
divide the input data into a training data subset, a validation data subset, and a test data subset;
select at least one machine learning model using the training data subset, the validation data subset, and the test data subset based on k-fold cross validation;
tune hyper parameters for each of the at least one machine learning model; and
generate a learning output using the at least one machine learning model and the hyper parameters for each of the at least one machine learning model, the learning output indicating a test root-mean-square error (RMSE) and a training RMSE, wherein the output is used to predict well interference between the at least one parent well and the child well.

11. The system of claim 10, wherein the at least one machine learning model comprises XGBoost Regressor, GBoost Regressor, and PolynomialFeatures (2)/Elastic Net.

12. The system of claim 10, wherein the at least one machine learning model comprises an ensemble model having a weighting ratio of three parts XGBoost Regressor, one part GBoost Regressor, and one part PolynomialFeatures (2)/Elastic Net.

13. The system of claim 10, the at least one processor further to predict well production for the at least one parent well and the child well using the at least one machine learning model.

14. The system of claim 10, wherein the properties associated with the at least one parent well and the child well comprise at least one of well production over a period of time, fluid type, fluid volume, additive type, additive concentration, proppant type, proppant size, proppant concentration, proppant mass, and pumping rate.

15. The system of claim 10, wherein the properties associated with the at least one parent well and the child well comprise well spacing between the at least one parent well and the child well.

16. The system of claim 10, wherein the properties associated with the at least one parent well and the child well comprise a period of time between when the at least one parent well begins to produce and the child well begins to produce.

17. The system of claim 10, wherein the child well is a fully-bounded child well.

18. The system of claim 10, wherein the child well is a half-bounded child well.

19. A non-transitory computer-readable medium having instructions stored thereon that, when executed by at least one processor, cause the at least one processor to perform operations comprising:
obtaining input data comprising properties associated with at least one parent well and a child well associated with the at least one parent well;
dividing the input data into a training data subset, a validation data subset, and a test data subset;
selecting at least one machine learning model using the training data subset, the validation data subset, and the test data subset based on k-fold cross validation;
tuning hyper parameters for each of the at least one machine learning model; and
generating a learning output using the at least one machine learning model and the hyper parameters for each of the at least one machine learning model, the learning output indicating a test root-mean-square error (RMSE) and a training RMSE, wherein the output is used to predict well interference between the at least one parent well and the child well.

20. The non-transitory computer-readable medium of claim 19, the operations further comprising predicting well production for the at least one parent well and the child well using the at least one machine learning model.

* * * * *